(12) United States Patent  (10) Patent No.: US 8,172,539 B2
Kootstra  (45) Date of Patent: May 8, 2012

(54) WIND TURBINE ROTOR BLADE JOINT

(75) Inventor: Dirk Jan Kootstra, Beekbergen (NL)

(73) Assignee: General Electric Company, Schenectady, NY (US)

( * ) Notice: Subject to any disclaimer, the term of this patent is extended or adjusted under 35 U.S.C. 154(b) by 49 days.

(21) Appl. No.: 12/817,549

(22) Filed: Jun. 17, 2010

(65) Prior Publication Data

US 2011/0299995 A1 Dec. 8, 2011

(51) Int. Cl.
B63H 1/26 (2006.01)
B64C 11/16 (2006.01)
F01D 5/14 (2006.01)
(52) U.S. Cl. .................................................. 416/223 R
(58) Field of Classification Search .............. 416/223 R, 416/225, 226
See application file for complete search history.

(56) References Cited

U.S. PATENT DOCUMENTS

| | | | |
|---|---|---|---|
| 2,869,649 A * | 1/1959 | Lux | 416/88 |
| 4,474,536 A | 10/1984 | Gougeon et al. | |
| 4,732,542 A | 3/1988 | Hahn et al. | |
| 5,269,652 A * | 12/1993 | Petersen | 416/14 |
| 7,521,105 B2 | 4/2009 | Bech et al. | |
| 2007/0253824 A1* | 11/2007 | Eyb | 416/223 R |
| 2009/0155084 A1* | 6/2009 | Livingston et al. | 416/223 R |
| 2009/0162206 A1 | 6/2009 | Zirin et al. | |
| 2010/0054950 A1 | 3/2010 | Rao Kavala | |
| 2010/0143148 A1* | 6/2010 | Chen et al. | 416/241 R |
| 2010/0158694 A1* | 6/2010 | Stam et al. | 416/230 |

FOREIGN PATENT DOCUMENTS

| | | |
|---|---|---|
| DE | 19962989 | 7/2001 |
| DE | 10336461 | 3/2005 |
| JP | 2002357176 | 12/2002 |
| WO | WO 03/078832 | 9/2003 |
| WO | WO 2005/100781 | 10/2005 |
| WO | WO 2006/002621 | 1/2006 |
| WO | WO 2006/056584 | 6/2006 |

OTHER PUBLICATIONS

English Abstract of DE 10336461.
English Abstract of DE 19962989.
English Abstract of JP 20022357176.

* cited by examiner

Primary Examiner — Edward Look
Assistant Examiner — Su Htay
(74) Attorney, Agent, or Firm — Dority & Manning, P.A.

(57) ABSTRACT

A blade joint for joining a first blade segment and a second blade segment, each having an aerodynamic profile, in a rotor blade is disclosed. The blade joint includes a first joint segment and a second joint segment each having an outer surface, an inner surface, and a thickness therebetween. The outer surface of each joint segment has an aerodynamic profile. The first joint segment and the second joint segment each further have a joint interface end, a blade interface end, and a length therebetween. The joint interface end of the first joint segment and the joint interface end of the second joint segment are configured to couple the first joint segment and second joint segment together.

20 Claims, 7 Drawing Sheets

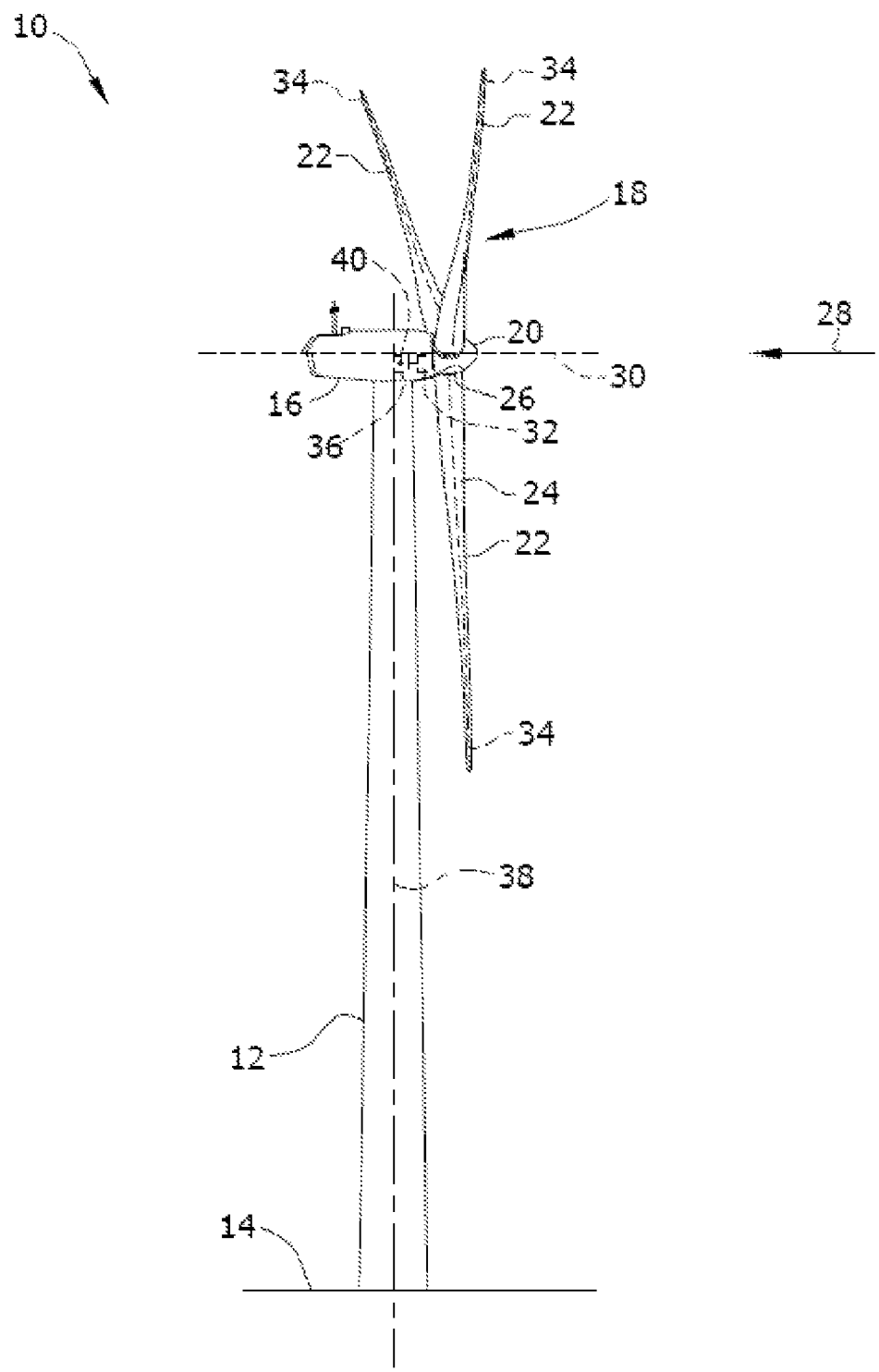
FIG. -1-

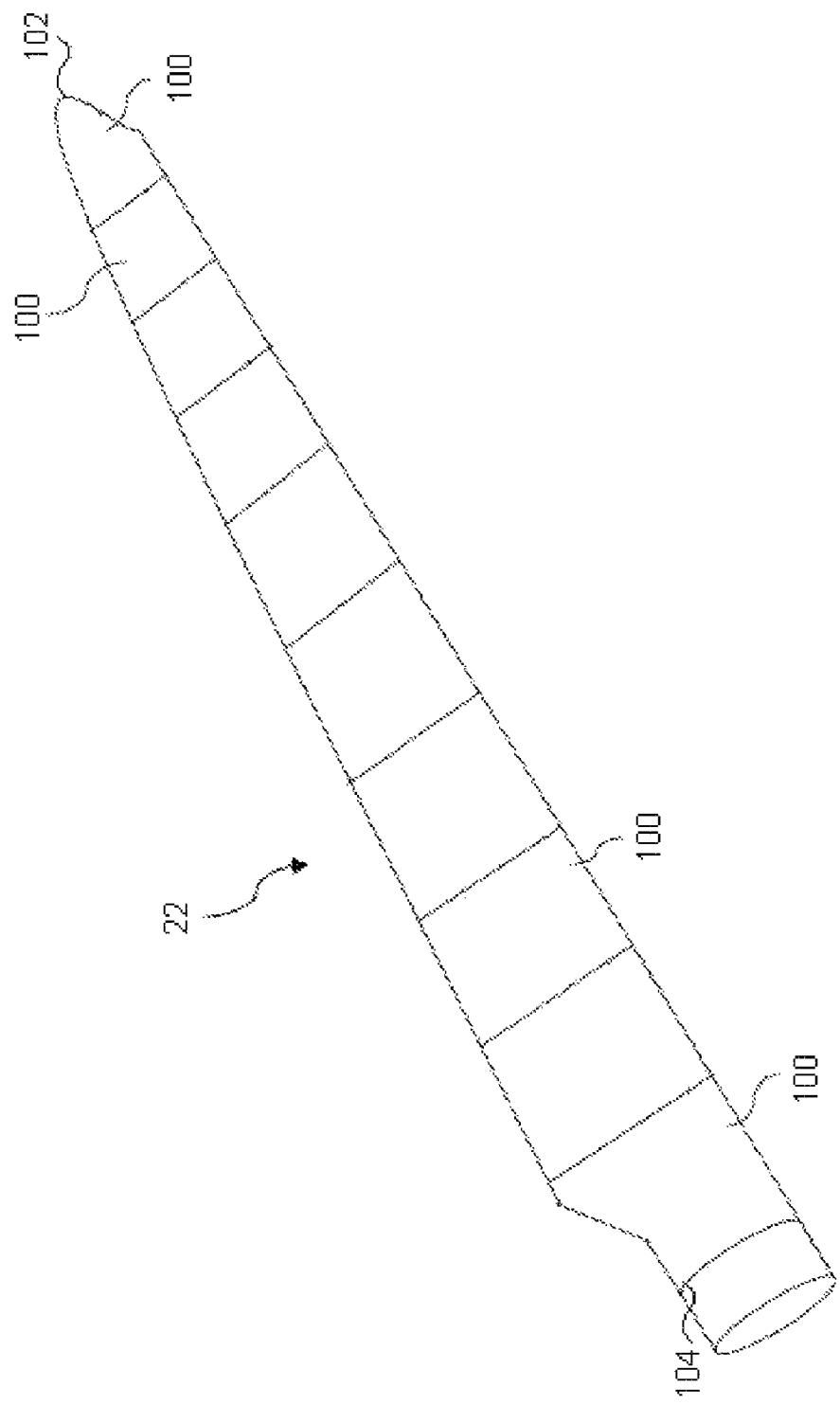
FIG. -2-

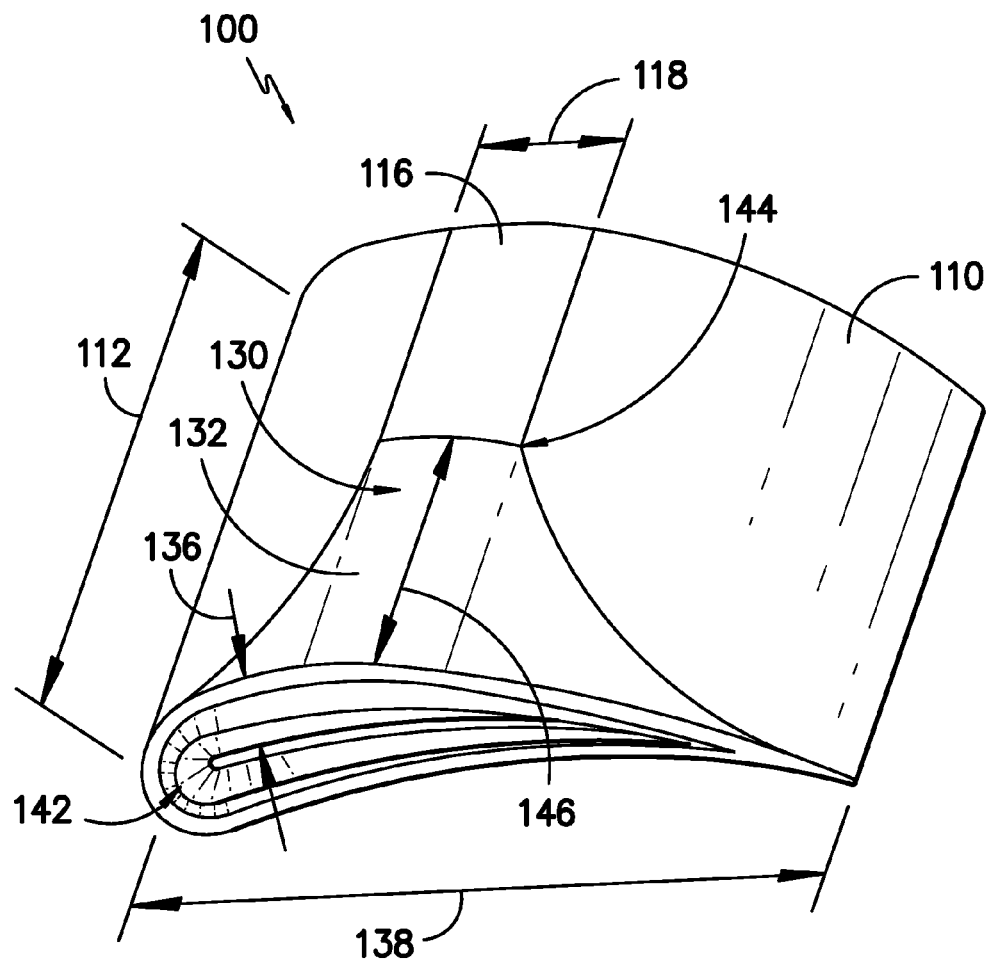
FIG. -3-

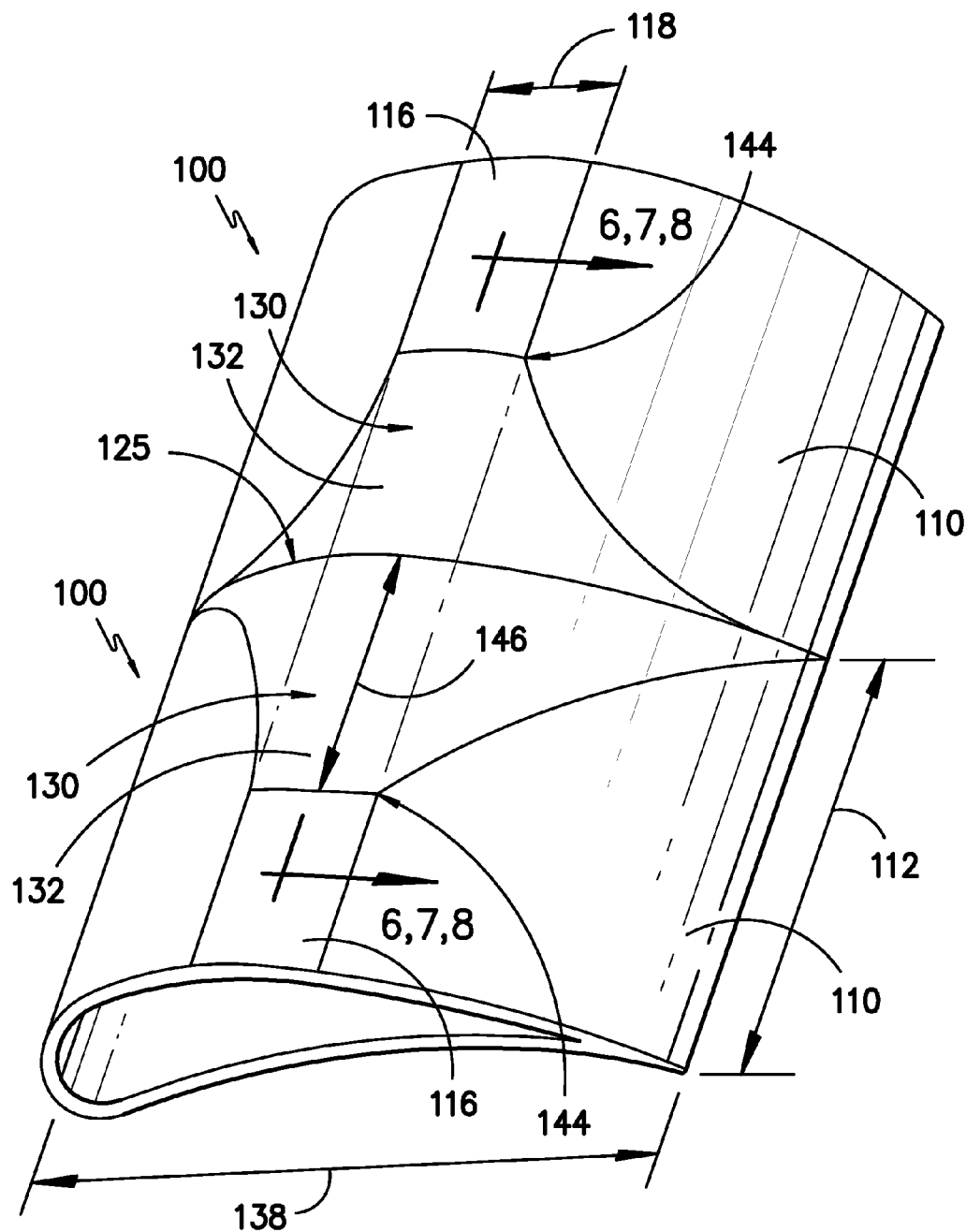
FIG. —4—

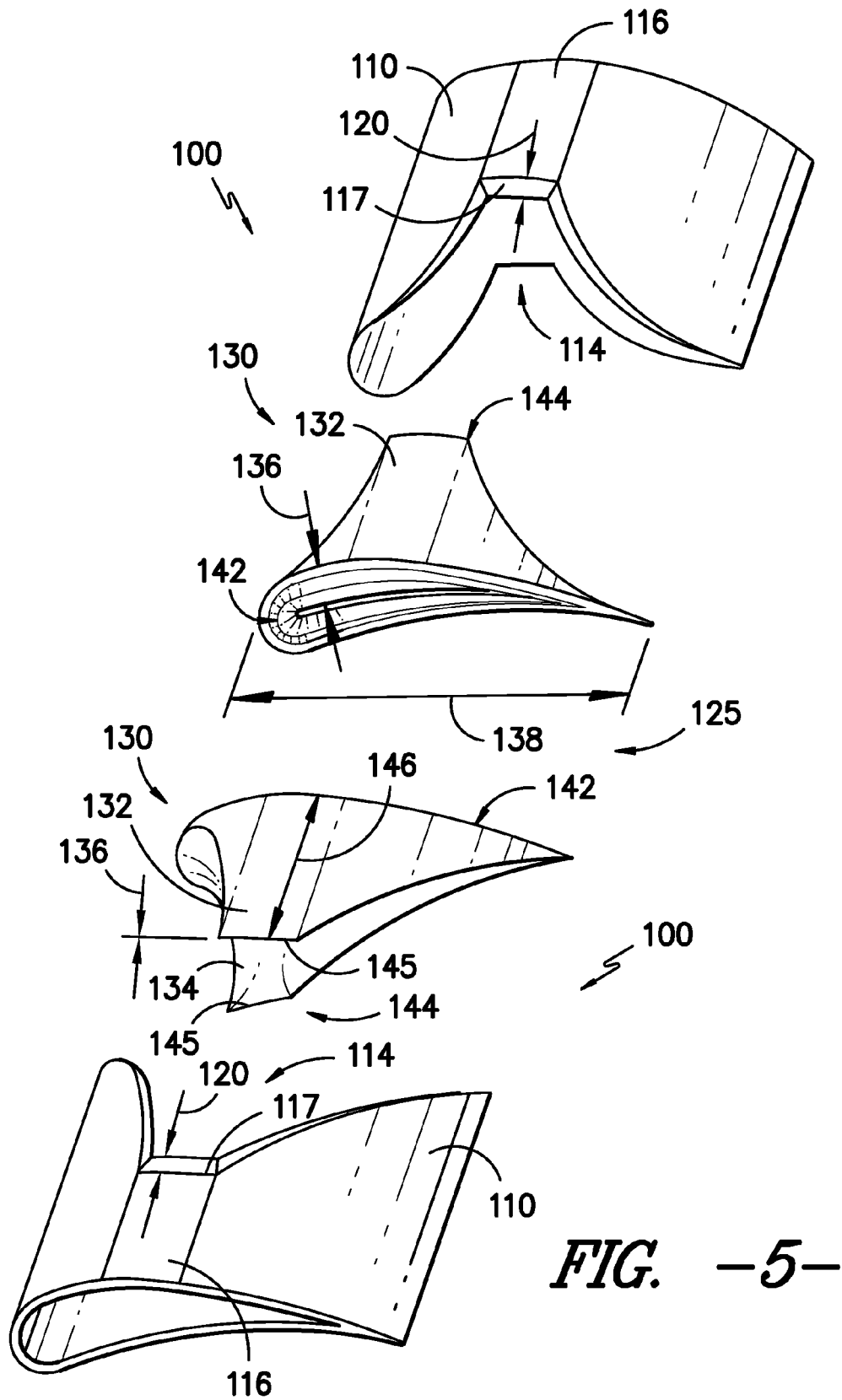
FIG. -5-

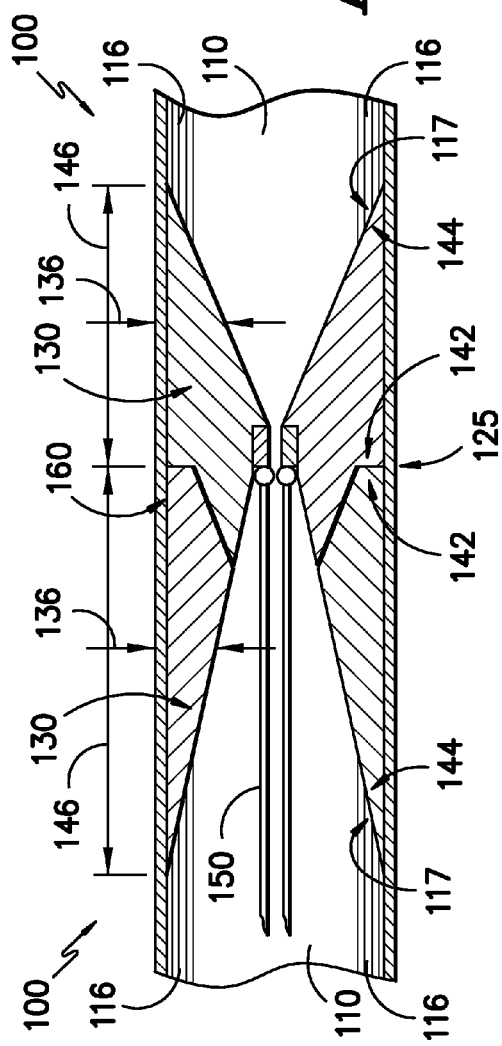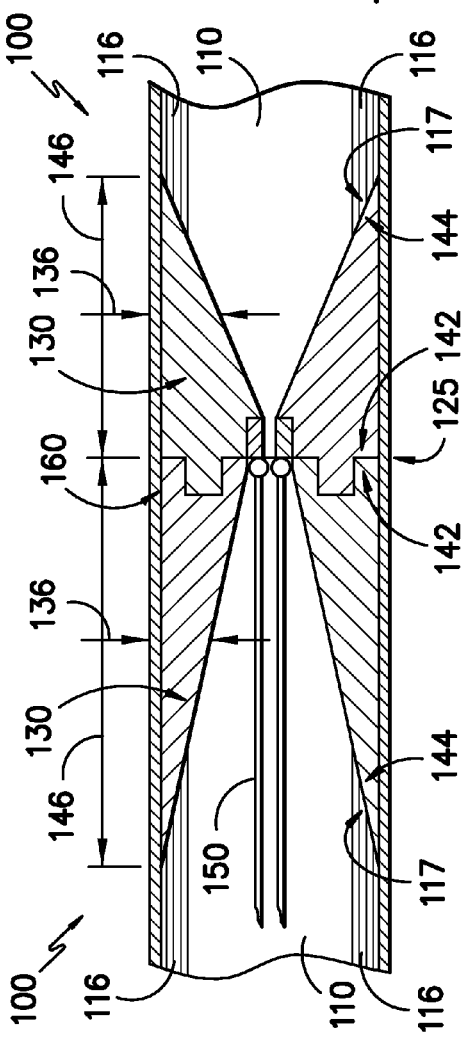

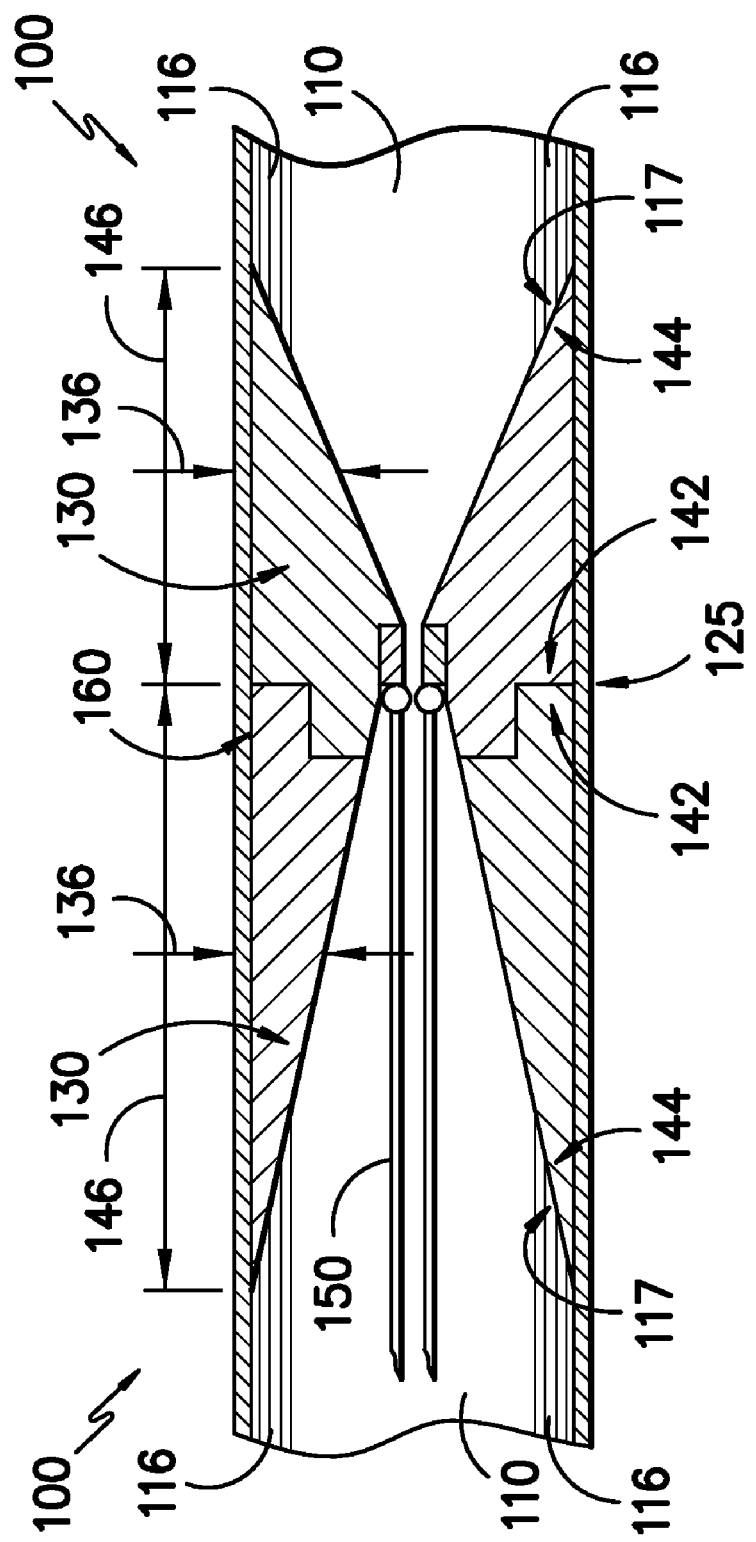

WIND TURBINE ROTOR BLADE JOINT

FIELD OF THE INVENTION

The present disclosure relates in general to wind turbine rotor blades, and more particularly to blade joints for joining blade segments in wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The construction of a modern rotor blade generally includes skin or shell components, spar caps, and one or more shear webs. The skin, typically manufactured from layers of fiber composite and a lightweight core material, forms the exterior aerodynamic foil shape of the rotor blade. The spar caps provide increased rotor blade strength by integrating one or more structural elements running along the length of the rotor blade on both interior sides of the rotor blade. Shear webs are structural beam-like components running essentially perpendicular between the top and bottom spar caps and extending across the interior portion of the rotor blade between the outer skins. Spar caps have typically been constructed from fiber reinforced composites, such as, for example, glass fiber reinforced composites or carbon fiber reinforced composites.

The size, shape, and weight of rotor blades are factors that contribute to energy efficiencies of wind turbines. An increase in rotor blade size increases the energy production of a wind turbine, while a decrease in weight also furthers the efficiency of a wind turbine. Furthermore, as rotor blade sizes grow, extra attention needs to be given to the structural integrity of the rotor blades. Presently, large commercial wind turbines in existence and in development are capable of generating from about 1.5 to about 12.5 megawatts of power. These larger wind turbines may have rotor blade assemblies larger than 90 meters in diameter. Additionally, advances in rotor blade shape encourage the manufacture of a forward swept-shaped rotor blade having a general arcuate contour from the base to the tip of the blade, providing improved aerodynamics. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

As the size of wind turbines increases, particularly the size of the rotor blades, so do the respective costs of manufacturing, transporting, and assembly of the wind turbines. The economic benefits of increased wind turbine sizes must be weighed against these factors. For example, the costs of pre-forming, transporting, and erecting a wind turbine having rotor blades in the range of 90 meters may significantly impact the economic advantage of a larger wind turbine.

One known strategy for reducing the costs of pre-forming, transporting, and erecting wind turbines having rotor blades of increasing sizes is to manufacture the rotor blades in blade segments. After the individual blade segments are transported to the erection location, the blade segments are assembled using various mechanical fastening devices, such as bolts or rivets. However, mechanical fastening devices have a variety of disadvantages. For example, the use of mechanical fastening devices requires relatively more material for construction of the blade segments, which increases the size and the weight of the rotor blades, and also increases the amount of labor needed to assemble the wind turbine. Further, increases in size and weight caused by the use of mechanical fastening devices result in additional stresses on the rotor blades between the various blade segments and additional material stress and strain in the blade segment joining regions.

Accordingly, there is a need for a wind turbine rotor blade design that is particularly adaptable for larger wind turbines, and which minimizes the associated transportation and assembly costs of the wind turbine without sacrificing the structural rigidity and energy efficiencies of the wind turbine. More specifically, there is a need for a fastening system for wind turbine rotor blade segments that simplifies the assembly of the blade segments into a rotor blade, and that reduces the weight and the stresses associated with the assembled rotor blade.

BRIEF DESCRIPTION OF THE INVENTION

Aspects and advantages of the invention will be set forth in part in the following description, or may be obvious from the description, or may be learned through practice of the invention.

In one embodiment, a blade joint for joining a first blade segment and a second blade segment, each having an aerodynamic profile, in a rotor blade is disclosed. The blade joint includes a first joint segment and a second joint segment, each having an outer surface, an inner surface, and a thickness therebetween. The outer surface of each joint segment has an aerodynamic profile. The first joint segment and the second joint segment each further have a joint interface end, a blade interface end, and a length therebetween. The joint interface end of the first joint segment and the joint interface end of the second joint segment are configured to couple the first joint segment and second joint segment together.

In another embodiment, a blade segment for a rotor blade having an aerodynamic profile and formed from a plurality of blade segments is disclosed. The blade segment includes a shell segment having a generally aerodynamic profile and a length. The shell segment further defines a cutaway portion. The blade segment further includes a plurality of spar caps extending at least partially through the length of the shell segment, each of the spar caps having a width and a thickness. The blade segment further includes a joint segment disposed in the cutaway portion and bonded to the shell segment and the plurality of spar caps. The joint segment has an outer surface, an inner surface, and a thickness therebetween. The outer surface of the joint segment has an aerodynamic profile corresponding to the aerodynamic profile of the shell segment. The joint segment further has a joint interface end, a blade interface end, and a length therebetween.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an exemplary wind turbine;

FIG. 2 is a perspective view of a segmented wind turbine rotor blade in accordance with aspects of the disclosure;

FIG. 3 is a perspective view of one embodiment of a blade segment and joint segment of the present disclosure;

FIG. 4 is a perspective view of one embodiment of two adjacent blade segments and a blade joint of the present disclosure;

FIG. 5 is an exploded perspective view of one embodiment of two adjacent blade segments and a blade joint of the present disclosure;

FIG. 6 is a cross-sectional view of one embodiment of two adjacent blade segments and a blade joint of the present disclosure;

FIG. 7 is a cross-sectional view of another embodiment of two adjacent blade segments and a blade joint of the present disclosure; and, FIG. 8 is a cross-sectional view of yet another embodiment of two adjacent blade segments and a blade joint of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support surface 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support surface 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26. In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position. Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support surface 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

Referring to FIG. 2, a segmented rotor blade 22 in accordance with aspects of the present disclosure is illustrated. The rotor blade 22 includes a plurality of individual blade segments 100 aligned in an end-to-end order from a blade tip 102 to a blade root 104. Each of the individual blade segments 100 is uniquely configured so that the plurality of segments 100 define a complete rotor blade 22 having the designed aerodynamic profile, length, and other desired characteristics. For example, each of the blade segments 100 may have an aerodynamic profile that corresponds to the aerodynamic profile of adjacent blade segments 100. Thus, the aerodynamic profiles of the blade segments 100 form a continuous aerodynamic profile of the rotor blade 22. In an exemplary embodiment, the complete segmented rotor blade 22 may have a swept shape giving it a curved contoured aerodynamic profile running from the distal end to the proximal end of the rotor blade 22. In an alternative embodiment, the segmented rotor blade 22 may have a non-swept shape and respective aerodynamic profile.

Referring to FIGS. 3 through 5, each of the individual blade segments 100 of the present disclosure may include a shell segment 110. The shell segment 110 may have a generally aerodynamic profile, such as an aerodynamic profile generally corresponding to the aerodynamic profile of the rotor blade 22 and adjacent shell segments 110. The shell segments 110 may have a length 112, and may define at least one cutaway portion 114.

In some embodiments, the shell segment 110 may be a unitary shell. In alternative embodiments, the shell segment 110 may be formed from a plurality of shell components. These shell components may be individually formed and joined together at the leading and trailing edges of the shell segment 110. The shell segment 110 may include an inner and outer skin and may be constructed, for example, from a dry fibrous material. In addition, the shell segment 110 may include a core material sandwiched between the inner and outer skins. This core material may be, for example, a light-weight material, such as balsa wood, extruded polystyrene foam, or the like.

Each individual blade segment 100 may further include a plurality of spar caps 116. The spar caps 116 may extend at least partially through the length 112 of the shell segment 110, and each spar cap 116 may have a width 118 and a thickness 120 (see FIG. 5). Internal shear webs (not shown) may extend through the shell segments 110 between the spar caps 116, such that the spar caps 116 and internal shear webs generally form structural members, which may be, for example, I-shaped or box-shaped structural members. The spar caps 116 and internal shear webs may generally provide structural rigidity to the individual blade segments 100. The spar caps 116 may have shape and curvatures that essentially correspond to the shapes and curvatures of the shell segments 110, such that the aerodynamic profiles of the spar caps correspond to the aerodynamic profiles of the shell segments 110. The spar caps 116 may generally be formed of a carbon fiber reinforced matrix or a glass fiber reinforced polymer, or other strong, light-weight material.

Each of the blade segments 100 may include a joint segment 130. The joint segment 130, in exemplary embodiments, may be a pre-fabricated, composite component formed by, for example, filament winding, a fabric lay-up process, or any fiber-placement technique. It should be understood that the joint segment 130 of the present disclosure may be formed from any suitable material, such as, for example, any light-weight material disclosed herein. It should further be understood that the joint segment 130 of the present disclosure may be formed using any suitable forming technique.

The joint segment 130 of the present disclosure may be shaped to be disposed in the cutaway portion 114 of the shell segment 110, as discussed below. Thus, the joint segment 130, shell segment 110, and spar caps 116 may generally form a blade segment 100. In general, the joint segment 130 may be bonded to the shell segment 110 and the spar caps 116 using any suitable bonding technique, including any bonding technique using a bonding paste or infusing resin.

The joint segment 130 of the present disclosure has an outer surface 132, an inner surface 134 (see FIG. 5), and a thickness 136 therebetween. The joint segment 130 additionally has a joint interface end 142, a blade interface end 144, and a length 146 therebetween. Further, it should be understood that the blade interface end 144 may have two or more blade interface end portions 145 (see FIG. 5), each portion 145 configured to couple with a component of the blade segment 100, such as a spar cap 116 as discussed below. Further, the outer surface 132 may have an aerodynamic profile. In exemplary embodiments, the aerodynamic profile of the outer surface 132 may correspond to the aerodynamic profile of the shell segment 110 and the spar caps 116. Thus, the joint segment 130, shell segment 110, and spar caps 116 may together have a continuous aerodynamic profile.

In exemplary embodiments, the thickness 136 of the joint segment 130 may increase along at least a portion of the length 146 of the joint segment 130. For example, the thickness 136 may increase along at least a portion of the length 146 from the blade interface end 144 to the joint interface end 142. Thus, the joint interface end 142 may have a thickness 136 that is greater than the thickness 136 at the blade interface end 144.

The blade interface end 144 may be configured to interact with components of the blade segment 100. For example, the blade interface end portions 145 may in exemplary embodiments be coupled to the spar caps 116. In exemplary embodiments, each of the spar caps 116 may include a tapered joint interface end 117 having a rate of taper. The thickness 136 of the joint segment 130 may increase at a rate substantially similar to the rate of taper of each of the spar caps 116. Further, in exemplary embodiments, the thickness 136 of the joint segment 130 at the joint interface end 142 may be approximately seven times the thickness 120 of the spar caps 116. Thus, the thickness 136 of the joint segment 130 may taper at an appropriate rate of taper from a relatively greater thickness at the joint interface end 142 to a minimal or zero thickness at the blade interface end 144. By providing an appropriate thickness 136 with an appropriate rate of taper relative to the thickness 120 and taper of the spar caps 116, the joint segments 130 may thus provide spar caps 116 with an appropriate rate of loading during operation of the wind turbine 10, thus ensuring that the segmented rotor blades 22 do not fail during operation. It should be understood that the rates of taper and the ratio of the thickness 136 of the joint segment 130 at the joint interface end 142 to the thickness 120 of the spar caps 116 may be any suitable rates and ratios to provide suitable loading of the spar caps 116.

The joint segment 130 of the present disclosure may also have a width 138. In exemplary embodiments, the width 138 may increase along at least a portion of the length 146 of the joint segment 130, such as from the blade interface end 144 to the joint interface end 142. For example, the width 138 at the joint interface end 142 may be approximately equal to the chord width of the blade segment 100, and the width 138 at the blade interface end 144 may be approximately equal to the width 118 of each of the spar caps 116. Further, it should be understood that the width of the cutaway portion 114 may be approximately equal to the width 138 of the joint segment 130, and that the width of the cutaway portion 114 may vary with the width 138 of the joint segment 130.

It should be understood that the joint segment 130 of the present disclosure is not limited to embodiments for use with blade segments 100 having only two spar caps 116 forming one structural member in the blade segment 100. For example, the blade segment 100 may have four or more spar caps 116 forming two or more structural members. The joint segment 130 of these embodiments may include multiple joint interface ends 142 to couple with the spar caps 116, and the width 138 of the joint segment 130 may vary and be measured in width sections, with each joint interface end 142 having a width approximately equal to the width 118 of the respective spar caps 116.

In exemplary embodiments as shown in FIGS. 6 through 8, the joint interface end 142 of the joint segment 130 may be configured to couple the blade segment 100 to an adjacent blade segment 100 to form a complete or partial rotor blade 100. For example, the joint interface end 142 of the joint segment 130 may be configured to couple with the joint interface end 142 of the adjacent blade segment 100. The adjacent joint interface ends 142 may have, for example, overlapping edges, male-female interlocking features, or other suitable structures that ensures a positive engagement and alignment of the joint interface ends. Thus, in exemplary embodiments, the joint interface end 142 of the present disclosure may be a female joint interface end or a male joint interface end. "Female," as used herein, means any joining feature of a component configured to accept a joining feature of a separate component, such as a recess. "Male," as used herein, means any joining feature of a component configured to be accepted by a joining feature of a separate component, such as a protrusion. When the adjacent joint interface ends 142 are coupled together, they may be bonded using any suitable bonding technique, including any bonding technique using a bonding paste or infusing resin.

In certain exemplary embodiments, the blade segment 100 of the present disclosure may include a tensioning mechanism 150. The tensioning mechanism 150 may be configured to secure the blade segment 100 to adjacent blade segments 100 in the rotor blade 22. For example, the tensioning mechanism 150 in one embodiment may be mounted to the joint segment 130 of a blade segment 100. In exemplary embodiments, the tensioning mechanism 150 may be mounted to the joint segment 130 of the blade segment 100 adjacent the blade tip 102 and having a male joint interface end 142. However, it should be understood that the tensioning mechanism 150 may be mounted to any joint segment 130 in any blade segment 100 in the rotor blade 22.

The tensioning mechanism 150 may secure adjacent blade segments 100 together by applying a tensile compressive force to the blade segments 100. For example, in one embodiment, the tensioning mechanism 150 may be a cable, such as a steel cable, or a plurality of cables. The cables may be mounted at one end to a joint segment 130, as discussed above, and at the other end to any location in another blade segment 100 or adjacent to the blade root 104. When a tensile force is applied to the tensile mechanism 150, the tensile mechanism may compress the adjacent blade segments 100 together, thus securing the blade segments 100 in the rotor blade 22.

In exemplary embodiments, the aerodynamic profiles of the shell segment 110, spar caps 116, and joint segment 130 correspond to the aerodynamic profile of the rotor blade 22. Thus, the segmented rotor blade 22 may include a plurality of blade segments 100 with corresponding aerodynamic profiles, such that the rotor blade 22 has a continuous aerodynamic profile. In some embodiments as shown in FIGS. 6 through 8, the blade segments 100 may include a skin layer 160 covering the shell segment 110, the spar caps 116, and the joint segment 130. The skin layer 160 may further provide a continuous aerodynamic profile to the blade segments 100. The skin layer 160 may be a unitary skin layer covering the entire rotor blade 22, or may be a segmented skin layer covering a blade segment 100, a portion of a blade segment 100, or a plurality of blade segments 100.

The present disclosure also encompasses a blade joint 125 for joining a first blade segment 100 and a second blade segment 100 each having an aerodynamic profile in a rotor blade 22. The blade joint 125 may include a first joint segment 130 and a second joint segment 130, as discussed in detail above. The joint interface end 142 of the first joint segment 130 and the joint interface end 142 of the second joint segment 130 may be configured to couple the first joint segment 130 and the second joint segment 130 together. For example, as discussed above and shown in FIGS. 6 through 8, the joint interface end 142 of the first joint segment 130 may be a female joint interface end and the joint interface end 142 of the second joint segment 130 may be a male joint interface end. Further, in exemplary embodiments, the joint interface end 142 of the first joint segment 130 and the joint interface end 142 of the second joint segment 130 may be configured to couple the first joint segment 130 and the second joint segment 130 together without the use of mechanical fasteners. For example, the first joint segment 130 and the second joint segment 130 may be coupled together as discussed herein and then bonded using any suitable bonding technique, including any bonding technique using a bonding paste or infusing resin.

In exemplary embodiments, as discussed above, the aerodynamic profile of the first joint segment 130 may correspond to the aerodynamic profile of the first blade segment 100, and the aerodynamic profile of the second joint segment 130 may correspond to the aerodynamic profile of the second blade segment 100. Thus, the first and second blade segments 100 and the respective first and second joint segments 130 may each form continuous aerodynamic profiles. Additionally, in exemplary embodiments, the aerodynamic profile of the first joint segment 130 may correspond to the aerodynamic profile of the second joint segment 130. Thus, the blade joint 125 may form a continuous aerodynamic profile. Further, the first and second blade segments 100 and the respective first and second joint segments 130 may form a single continuous aerodynamic profile, which may in exemplary embodiments correspond to the aerodynamic profile of the rotor blade 22.

One or more of the joint segments 130 of the blade joint 125 may include a tensioning mechanism 150. For example, in exemplary embodiments, the second joint segment 130 may include the tensioning mechanism 150, as discussed above. The tensioning mechanism 150 may be configured to secure the first joint segment 130 and the second joint segment 130 together, as discussed above.

In exemplary embodiments, the first joint segment 130 may be bonded to the first blade segment 100, and the second joint segment 130 may be bonded to the second blade segment 100, such as through any suitable bonding technique, including any bonding technique using a bonding paste or infusing resin.

It should be understood that the present disclosure is not limited to the use of two joint segments 130 in two blade segments 100 to form a rotor blade 22. Rather, any number of blade segments 100 may be coupled together using the blade joint 125 of the present disclosure to form a rotor blade 22. For example, a blade segment 100 of the present disclosure may include more than one cutaway portion 114, such as two opposing cutaway portions 114, such that the blade segment 100 may be coupled on each opposing end to adjacent blade segments 100. Joint segments 130 may be disposed in the cutaway portions 114. One joint segment 130 may have a female joint interface end 142 for coupling with a male joint interface end 142 of an adjacent joint segment 130. Another joint segment 130 may have a male joint interface end 142 for coupling with a female joint interface end 142 of an adjacent joint segment 130.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A blade joint for joining a first blade segment and a second blade segment, each having an aerodynamic profile, in a rotor blade, the blade joint comprising:
   a first joint segment and a second joint segment each having an outer surface, an inner surface, and a thickness therebetween, the outer surface of each joint segment having an aerodynamic profile, the first joint segment and the second joint segment each further having a joint interface end, a blade interface end, and a length therebetween,
   wherein the joint interface end of the first joint segment and the joint interface end of the second joint segment are configured to couple the first joint segment and second joint segment together, wherein the aerodynamic profile of the outer surface of the first joint segment corresponds to the aerodynamic profile of the first blade segment, and wherein the aerodynamic profile of the outer surface of the second joint segment corresponds to the aerodynamic profile of the second blade segment.

2. The blade joint of claim 1, wherein the thickness of each joint segment increases along at least a portion of the length of the joint segment from the blade interface end to the joint interface end.

3. The blade joint of claim 1, wherein the joint interface end of the first joint segment is a female joint interface end and the joint interface end of the second joint segment is a male joint interface end.

4. The blade joint of claim 1, wherein the first joint segment and the second joint segment each have a width, and wherein the width of each joint segment increases along at least a portion of the length of the joint segment from the blade interface end to the joint interface end.

5. The blade joint of claim 1, wherein the aerodynamic profile of the first joint segment corresponds to the aerodynamic profile of the first blade segment, and wherein the aerodynamic profile of the second joint segment corresponds to the aerodynamic profile of the second blade segment.

6. The blade joint of claim 1, wherein the aerodynamic profile of the first joint segment corresponds to the aerodynamic profile of the second joint segment.

7. The blade joint of claim 1, wherein the first joint segment is bonded to the first blade segment, and wherein the second joint segment is bonded to the second blade segment.

8. The blade joint of claim 1, wherein the second joint segment includes a tensioning mechanism configured to secure the first joint segment and second joint segment together.

9. The blade joint of claim 1, wherein the joint interface end of the first joint segment and the joint interface end of the second joint segment are configured to couple the first joint segment and second joint segment together without the use of mechanical fasteners.

10. A blade segment for a rotor blade having an aerodynamic profile and formed from a plurality of blade segments, the blade segment comprising:
    a shell segment having a generally aerodynamic profile and a length, the shell segment further defining a cutaway portion;
    a plurality of spar caps extending at least partially through the length of the shell segment, each of the spar caps having a width and a thickness; and,
    a joint segment disposed in the cutaway portion and bonded to the shell segment and the plurality of spar caps, the joint segment having an outer surface, an inner surface, and a thickness therebetween, the outer surface of the joint segment having an aerodynamic profile corresponding to the aerodynamic profile of the shell segment, the joint segment further having a joint interface end, a blade interface end, and a length therebetween.

11. The blade segment of claim 10, wherein the thickness of the joint segment increases along at least a portion of the length of the joint segment from the blade interface end to the joint interface end.

12. The blade segment of claim 11, wherein each of the spar caps includes a tapered joint interface end having a rate of taper, and wherein the thickness of the joint segment increases at a rate substantially similar to the rate of taper of each of the spar caps.

13. The blade segment of claim 10, wherein a width of the joint segment at the blade interface end is approximately equal to the width of each of the spar caps.

14. The blade segment of claim 10, wherein the joint interface end is configured to couple the blade segment to an adjacent blade segment.

15. The blade segment of claim 14, wherein the joint interface end is a female joint interface end.

16. The blade segment of claim 14, wherein the joint interface end is a male joint interface end.

17. The blade segment of claim 10, further comprising a tensioning mechanism configured to secure the blade segment to an adjacent blade segment.

18. The blade segment of claim 17, wherein the tensioning mechanism is mounted to the joint segment.

19. The blade segment of claim 10, wherein the aerodynamic profile of the shell segment and the aerodynamic profile of the joint segment correspond to the aerodynamic profile of the rotor blade.

20. A rotor blade comprising:
    a first blade segment comprising:
    a shell segment having an aerodynamic profile and a length, the shell segment further defining a cutaway portion;
    a plurality of spar caps extending at least partially through the length of the shell segment, each of the spar caps having a width and a thickness; and,
    a joint segment disposed in the cutaway portion and bonded to the shell segment and the plurality of spar caps, the joint segment having an outer surface, an inner surface, and a thickness therebetween, the outer surface of the joint segment having an aerodynamic profile corresponding to the aerodynamic profile of the shell segment, the joint segment further having a female joint interface end, a blade interface end, and a length therebetween; and,
    a second blade segment comprising:
    a shell segment having an aerodynamic profile and a length, the shell segment further defining a cutaway portion;
    a plurality of spar caps extending at least partially through the length of the shell segment, each of the spar caps having a width and a thickness; and,
    a joint segment disposed in the cutaway portion and bonded to the shell segment and the plurality of spar caps, the joint segment having an outer surface, an inner surface, and a thickness therebetween, the outer surface of the joint segment having an aerodynamic profile corresponding to the aerodynamic profile of the shell segment, the joint segment further having a male joint interface end, a blade interface end, and a length therebetween,
    wherein the aerodynamic profile of the joint segment of the first blade segment corresponds to the aerodynamic profile of the joint segment of the second blade segment, and wherein the female joint interface end and the male joint interface end are configured to couple the first blade segment and the second blade segment together.

* * * * *